Jan. 12, 1965 F. C. KELCOURSE 3,165,725
PROTECTED AMPLIFYING DEVICE
Filed Dec. 28, 1960
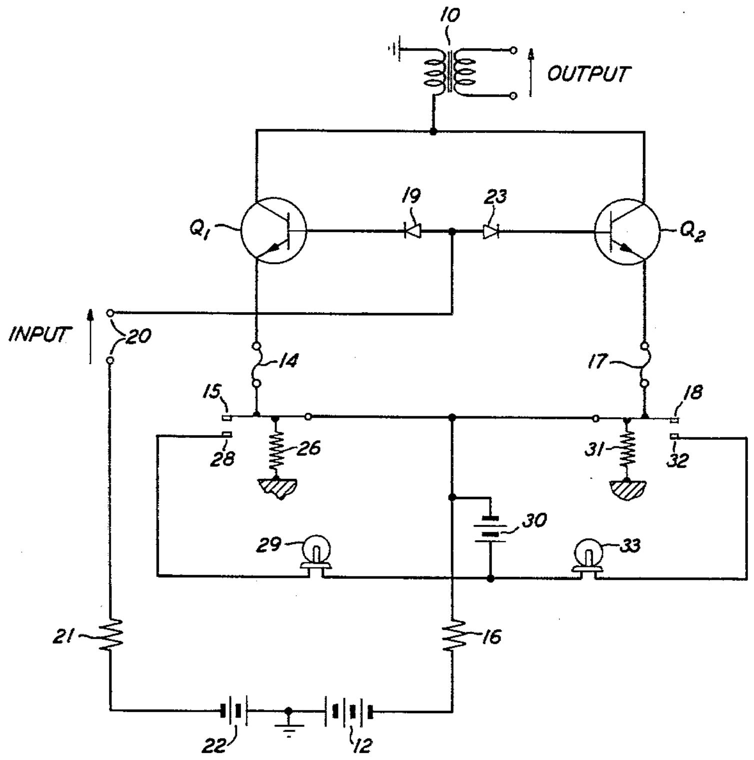
INVENTOR
F. C. KELCOURSE
BY R. B. Anderson
ATTORNEY 3,165,725
Patented Jan. 12, 1965

3,165,725

PROTECTED AMPLIFYING DEVICE

Francis C. Kelcourse, Methuen, Mass., assignor to Bell Telephone Laboratories, Incorporated, New York, N.Y., a corporation of New York Filed Dec. 28, 1960, Ser. No. 79,067
3 Claims. (Cl. 340—250)

This invention relates to arrangements for increasing the reliability of electronic equipment.

The complexity of many electronic systems has often imposed extremely stringent requirements on component reliability. This is not difficult to understand when one realizes that the failure of a single transistor may seriously disable a large computer or a coast-to-coast communications network. In order to increase system reliability, it has often been the practice to provide duplicate "standby" equipment which may be electromechanically switched into operation to replace a portion of the system which has become inoperative. An obvious disadvantage of this approach is that duplicate equipment is expensive and space consuming. Perhaps not so apparent is the disadvantage inherent in the slow acting electromechanical switching arrangements which are employed in such devices. In data handling systems opearting at the high "bit-rates" which are now commonly employed, the time required to sense a malfunction and to place such standby equipment in operation is sufficiently large that a considerable portion of the information being handled may be lost. As a consequence, entire operations might need to be repeated in order to correct the error which was produced.

It is, therefore, a principal object of the present invention to inexpensively and effectively protect electronic apparatus from becoming inoperative due to the failure of an integrant transistor.

A further object of the invention is to insure substantially continuous operation of such apparatus even though a transistor should fail.

In a principal aspect, the present invention takes the form of a parallel combination of two transistors arranged so that one takes over the entire load upon failure of the other without adverse effect upon the performance of the system as a whole. Each of these transistors is selected such that it would be capable of sustaining satisfactory operation by itself should the other fail. In order to prevent a transistor which becomes "open" or "shorted" from adversely affecting the remaining operative portion of the circuit, it is desirable to isolate the faulty element as rapidly as possible. In accordance with a principal feature of the present invention, this isolation is accomplished by means of a fuse serially connected with the emitter electrode of each transistor and a diode interposed between the base electrode of each transistor and the source of input signals. Because the operating characteristics of the device are similar to those of a single transistor, it may be substituted for a single amplifying element wherever increased component reliability is desirable. Due to its structural simplicity the invention provides an exceedingly economical means for protecting electronic apparatus without appreciably increasing the space requirements of the equipment.

A more complete understanding of the invention may be obtained from a study of the following detailed description of a specific embodiment of the invention.

The single figure in the attached drawing is a schematic representation of a protected transistor amplifier embodying the invention.

As shown in the drawing transistors $Q_1$ and $Q_2$ are connected in a parallel common-emitter amplifier configuration. The collector electrodes of the two transistors are both connected to ground through the primary winding of output transformer 10. The emitter electrode of transistor $Q_1$ is connected to the negative terminal of a battery 12 by a circuit path comprising a fusible element 14, a movable contact arm 15, and a resistance 16. Similarly, the emitter electrode of transistor $Q_2$ is connected to the negative terminal of battery 12 through a fusible element 17, a movable contact arm 18 and the resistance 16. Diode 19, poled in the direction of normal base current flow, is interposed between the base electrode of transistor $Q_1$ and one of the signal input terminals 20. The other terminal of the signal input 20 is connected to a negative bias supply made up of resistance 21 serially connected with battery 22. Diode 23 which is poled in the direction of normal base current flow of transistor $Q_2$ connects the base of transistor $Q_2$ to the bias supply through the input terminals in a similar manner.

The combination of the fusible element 14, the movable arm 15, spring 26, and contact 28 form an "indicating fuse" of a common type. Contact 28 is connected to the movable arm 15 through the filament of pilot lamp 29 and battery 30. A congruent arrangement made up of fusible element 17, movable arm 18, spring 31, contact 32, and pilot lamp 33 is connected to the emitter electrode of transistor $Q_2$.

Provided that both fusible elements 14 and 17 are intact, the circuit operates as a parallel transistor amplifier with the exception that each transistor is being operated farther below its maximum capability than would normally be required. This is due to the fact that each transistor has been selected such that its power handling capability is sufficient to comfortably operate the circuit on its own should the other fail.

For example, suppose that, after placing the parallel amplifier into operation, one of the transistors, say $Q_1$, should "open"—i.e., that all three electrodes of $Q_1$ become insulated from one another. In this case, since transistor $Q_2$ is capable of handling the power requirements on its own, the amplifier would continue to function as before—although with a slight change in gain.

Unfortunately, however, experience has shown that it is by far more common for transistors to fail by becoming "shorted"—i.e., that all the electrodes become electrically common. Were it not for the precautions taken as contemplated by the present invention, a shortened transistor would result in complete failure of the parallel amplifier. For instance, suppose that, after the parallel amplifier has been placed into operation, transistor $Q_2$ should subsequently become shorted. At this time, the collector-emitter current of transistor $Q_2$ tends to become large. The fast acting fusible element 17 will then "blow" opening the collector-emitter path to prevent transistor $Q_1$ from being "shunted." Diode 23 becomes back biased immediately upon the failure of $Q_2$, thereby preventing the loss of input signal to transistor $Q_1$.

The fusible element 17 also provides the mechanical support necessary to prevent the spring 31 from pulling the movable contact arm 18 against the contact 32. After the fusible element 17 blows, however the contacts 18 and 32 are pulled together allowing the pilot warning lamp 33 to burn, thereby notifying operating personnel of the failure. The faulty transistor may then be replaced when the equipment is idle. The indicating fuse arrangement may, of course, be omitted without detracting from the operating characteristics of the protected device since the remaining operative element is capable of sustaining operation without immedite replacement. Mere periodic checking of the fuses may in many cases be more desirable from an economic standpoint—especially where visual inspection of the fuses is not difficult.

Since transistors are particularly susceptible to failure due to changes in operating temperature, it will often be desirable to mount the two transistors at some distance from one another, thereby lessening the chance that both transistors might fail due to a single localized heating effect of the type often encountered.

The specific embodiment shown in the drawing utilizes n-p-n type transistors. Transistors of the opposite conductivity type may similarly utilize the principles of the invention merely by reversing the supply voltage polarities and the polarity of the diodes to allow normal base current flow. The fusible elements should remain on the emitter side rather than the collector side of the transistors in order to prevent high base-emitter current flow through a shorted transistor.

As mentioned earlier in the present specification, the failure of a single transistor causes only a slight change in gain. This results from the fact that $\beta_0$, the current gain of a parallel transistor amplifier, is approximately given by the relation:

$$\beta_0=\frac{2\beta_1\beta_2}{\beta_1+\beta_2}$$

where $\beta_1$ and $\beta_2$ are the separate common-emitter current gains of the two transistors. As can be seen, the parallel gain lies somewhere between the gains of the transistors separately. If $\beta_1$ is nearly equal to $\beta_2$, there will be little change in gain upon failure of one of the transistors. For instance, if $\beta_1=60$ and $\beta_2=80$, $\beta_0$ would be approximately 68.6. The gain, then, would drop 8.6 or rise 11.4 depending on which transistor failed.

It is to be undestood that the arrangement which has been described is illustrative of an application of the principles of the invention. Numerous other arrangements may be devised by those skilled in the art without departing from the spirit and scope of the invention.

What is claimed is:

1. In combination, a plurality of transistors, each of said transistors having base, emitter and collector electrodes, means for connecting the collector of each of said transistors to a first common conductor, a plurality of fusible elements each connecting the emitter electrode of one of said transistors to a second common conductor, a voltage source for establishing a potential difference between said first and second common conductors, an input terminal, a source of input signals effectively connected between said input terminal and said second common conductor, a plurality of diodes each connecting said input terminal to the base electrode of one of said transistors, said diodes being poled in a direction appropriate for presenting a low impedance to the flow of forward biasing current to said transistors.

2. The combination as set forth in claim 1 wherein said transistors are of like conductivity type.

3. The combination set forth in claim 2 including alarm means responsive to the occurrence of an open circuit condition in any one of said fusible elements for indicating the failure of the connected transistor.

References Cited in the file of this patent

UNITED STATES PATENTS

| | | |
|---|---|---|
| 2,821,697 | Minks | Jan. 28, 1958 |
| 2,824,296 | Hecht et al. | Feb. 18, 1958 |
| 2,878,380 | Holmes | Mar. 17, 1959 |
| 2,930,961 | Lezan | Mar. 29, 1960 |
| 3,045,168 | Fellendorf | July 17, 1962 |